United States Patent [19]
Korowitz et al.

[11] Patent Number: 6,076,124
[45] Date of Patent: *Jun. 13, 2000

[54] DISTRIBUTED CONTROL SYSTEM INCLUDING A COMPACT EASILY-EXTENSIBLE AND SERVICEABLE FIELD CONTROLLER

[75] Inventors: Simon Korowitz, Sharon; Harris D. Kagan, Foxboro; Harold Lake, Sharon, all of Mass.

[73] Assignee: The Foxboro Company, Foxboro, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 08/560,167

[22] Filed: Nov. 20, 1995

Related U.S. Application Data

[60] Provisional application No. 60/005,279, Oct. 10, 1995.

[51] Int. Cl.[7] .................................................. G06F 13/00
[52] U.S. Cl. .............................. 710/102; 710/101; 710/2; 710/62; 710/63; 710/64; 710/72; 361/686; 439/502
[58] Field of Search ..................................... 395/281, 282, 395/283, 309, 822, 828, 829, 830, 856, 858, 882, 883, 892, 200.79, 200.8; 361/684, 686, 752–754; 439/502

[56] References Cited

U.S. PATENT DOCUMENTS

| | | | |
|---|---|---|---|
| 5,162,986 | 11/1992 | Graber et al. | 395/821 |
| 5,349,343 | 9/1994 | Oliver | 340/825.52 |
| 5,410,717 | 4/1995 | Floro | 395/800.01 |
| 5,509,811 | 4/1996 | Homic | 439/55 |
| 5,531,328 | 7/1996 | Rochelo et al. | 206/706 |
| 5,544,006 | 8/1996 | Dimmick et al. | 361/684 |
| 5,555,510 | 9/1996 | Verseput et al. | 364/514 R |
| 5,563,400 | 10/1996 | Le Roux | 235/486 |
| 5,579,487 | 11/1996 | Meyerson et al. | 395/282 |
| 5,604,871 | 2/1997 | Pecone | 395/281 |

(List continued on next page.)

OTHER PUBLICATIONS

IC Card System 7 Design. Sep./Oct. 1995. Cover Page and Back Inside Cover.

*Primary Examiner*—Ayaz R. Sheikh
*Assistant Examiner*—Raymond N Phan
*Attorney, Agent, or Firm*—David Barron; David J. Powsner; Jules Jay Morris

[57] ABSTRACT

A field controller for use in a distributed control system including an area controller and at least one field controller. The field controller manages at least one controlled device in an industrial process operation. The field controller comprises a processor module segment through which it can control a selected number of devices, and it may also include one or more expansion module segments to enable it to control a larger number of controlled devices. The processor module segment includes a processor module and at least one local interface module for interfacing to a controlled device, and the expansion module segment includes interface modules for interfacing to other controlled devices. In the processor module segment, the processor module and said local interface module are interconnected by a bus segment, which is also connected to an upstream off-module connector. Each expansion module segment includes at least one interface module, and also includes a downstream off-module connector and an upstream off-module connector, which are interconnected by a bus segment. The downstream off-module connector of each expansion module segment is adapted to mate with the upstream off-module connector of the processor module segment and of other expansion module segment, so as to facilitate the interconnection of the processor module segment and a sequence of expansion module segments by establishing a unitary multi-drop bus comprising the processor module's bus segment and the bus segments of expansion module in the sequence. The processor module controls each controlled device through the respective local interface module or expansion interface module connected thereto. The processor module segment and each expansion module segment are each mounted in a housing segment which is configured to form a unitary housing when they are interconnected.

4 Claims, 13 Drawing Sheets

U.S. PATENT DOCUMENTS

| | | | |
|---|---|---|---|
| 5,611,057 | 3/1997 | Pecone et al. | 395/282 |
| 5,649,121 | 7/1997 | Budman et al. | 395/281 |
| 5,655,092 | 8/1997 | Ojala | 395/309 |
| 5,659,680 | 8/1997 | Cunningham et al. | 395/183.01 |
| 5,671,374 | 9/1997 | Postman et al. | 395/309 |
| 5,716,221 | 2/1998 | Kantner | 439/64 |
| 5,761,033 | 6/1998 | Wilhelm | 361/686 |

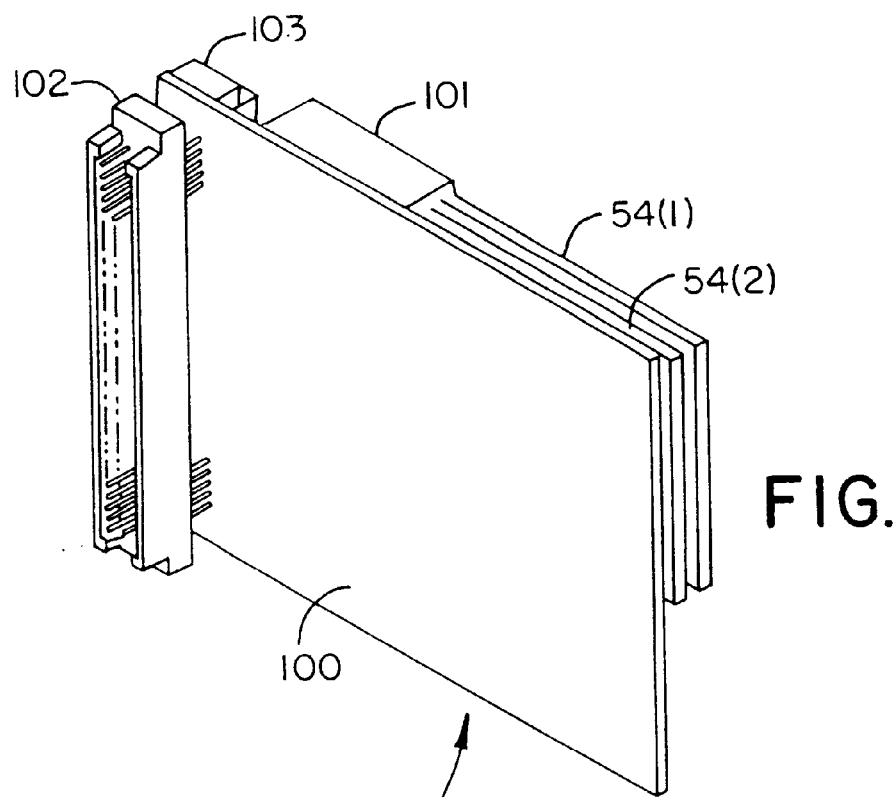
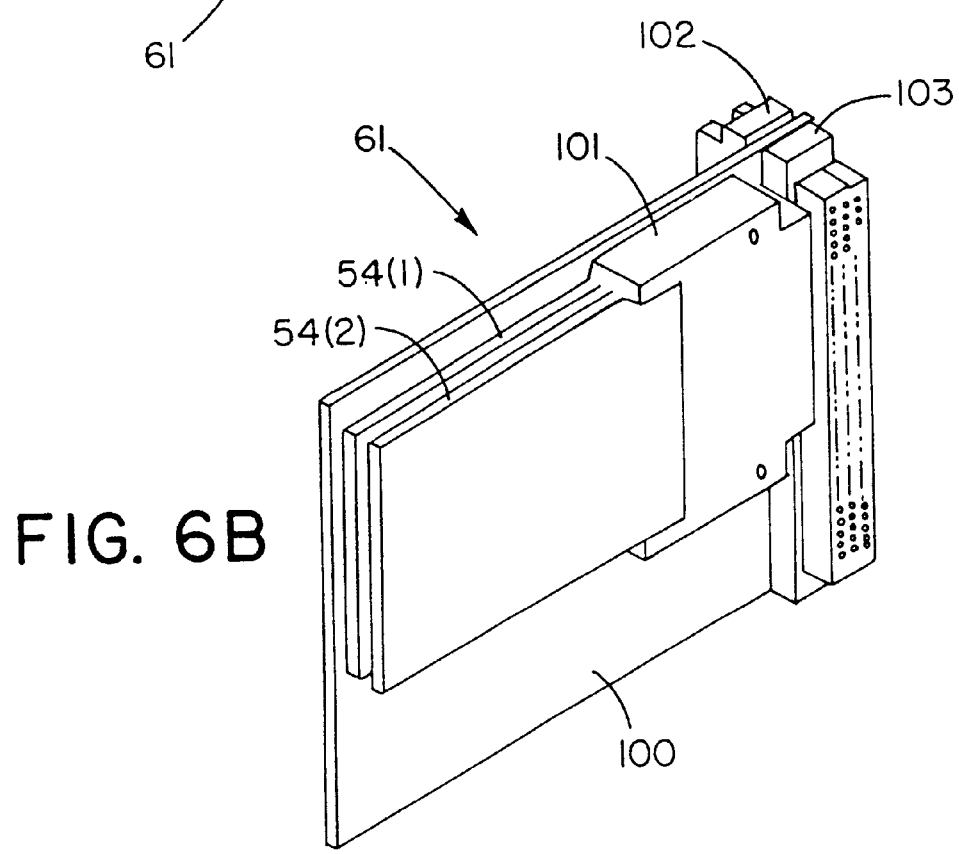

DISTRIBUTED CONTROL SYSTEM INCLUDING A COMPACT EASILY-EXTENSIBLE AND SERVICEABLE FIELD CONTROLLER

This application claims the benefit of priority of U.S. Provisional Ser. No. 60/005,279, filed Oct. 10, 1995, entitled "DISTRIBUTED CONTROL SYSTEM INCLUDING A COMPACT EASILY-EXTENSIBLE AND SERVICEABLE FIELD CONTROLLER."

FIELD OF THE INVENTION

The invention relates generally to the field of digital data processing systems, and more specifically to distributed monitoring and control systems which may be used in, for example, process control arrangements for controlling large industrial operations such as manufacturing plants or chemical processing plants, environmental monitoring control arrangements for controlling heating, air conditioning, ventilation, illumination, and other controllable environmental factors in industrial, commercial and home environments. The invention particularly provides a controller (called herein a "field controller") which provides a compact, computationally-powerful package which is convenient to install and service in a wide variety of environments.

BACKGROUND OF THE INVENTION

Distributed control systems are often used in a number of commercial, industrial and home applications, in particular to monitor and control operations at manufacturing, chemical processing and similar industrial operations, to monitor and control environmental and other factors and so forth. In a manufacturing operation, a distributed control system will typically control machines which facilitate the manufacture and assembly of the products being manufactured. In addition, in a chemical processing operation, a distributed control system may control valves to control rates of flow of chemicals into and out of reaction chambers, reaction temperatures and pressures and the like which are required to carry out the chemical process. In addition, to controlling the manufacturing or chemical process, distributed control systems may perform bookkeeping operations to keep track of the inventory of inputs required for the manufacturing or chemical process, as well as the inventory of outputs produced by the operation.

Typical distributed control systems essentially comprise large, centrally-located and expensive computer systems. A number of problems arise out of use of such computer systems, including the facts that they are expensive to maintain and typically have limited expansion capabilities.

SUMMARY OF THE INVENTION

The invention provides a relatively compact, computationally powerful, easily-extendable and easily-serviceable field controller for use in a variety of industrial, commercial and home applications.

In brief summary, the invention provides a new field controller for use in a distributed control system including an area controller and at least one field controller. The field controller manages at least one controlled device in an industrial process operation. The field controller comprises a processor module segment through which it can control a selected number of devices, and it may also include one or more expansion module segments to enable it to control a larger number of controlled devices. The processor module segment includes a processor module and at least one local interface module for interfacing to a controlled device, and the expansion module segment includes interface modules for interfacing to other controlled devices. In the processor module segment, the processor module and said local interface module are interconnected by a bus segment, which is also connected to an upstream off-module connector. Each expansion module segment includes at least one interface module, and also includes a downstream off-module connector and an upstream off-module connector, which are interconnected by a bus segment. The downstream off-module connector of each expansion module segment is adapted to mate with the upstream off-module connector of the processor module segment and of other expansion module segment, so as to facilitate the interconnection of the processor module segment and a sequence of expansion module segments by establishing a unitary multi-drop bus comprising the processor module's bus segment and the bus segments of expansion module in the sequence. The processor module controls each controlled device through the respective local interface module or expansion interface module connected thereto. The processor module segment and each expansion module segment are each mounted in a housing segment which is configured to form a unitary housing when they are interconnected.

A benefit of this arrangement is that the number of controlled devices which can be controlled by the field controller be easily increased or decreased by adding expansion module segments to, or removing them from, the field controller. Since the bus created by the series of bus segments is an extensible multi-drop bus, the controlled devices can be connected to the field controller through any interface module connected into the field controller along the bus. Since the processor module segment and each expansion module segment also includes an integral housing segment, when the processor module segment and expansion module segments are connected together they provide a unitary, compact housing which is convenient in a commercial, industrial or home environment.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIGS. 6A and 6B depict the physical structure of an expansion module circuit structure which is useful in the field controller depicted in FIGS. 3 and 4;

DETAILED DESCRIPTION OF AN ILLUSTRATIVE EMBODIMENT

Figure 1:
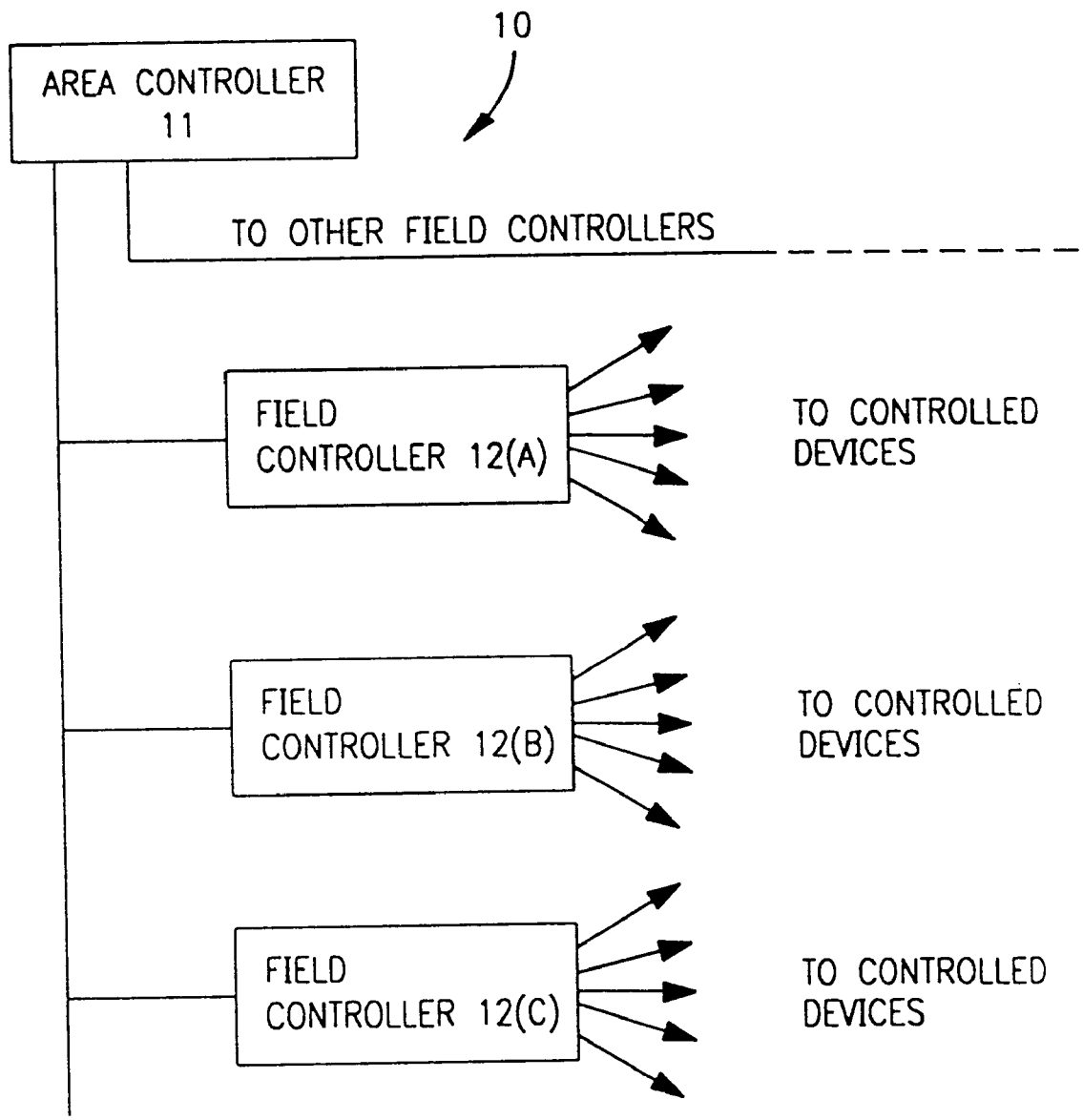
FIG. 1 is a functional block diagram of a distributed control system which includes a field controller constructed in accordance with the invention.

FIG. 1 is a functional block diagram of a distributed control system 10 which includes a field controller constructed in accordance with the invention. The distributed control system 10 may be used, for example, in a number of commercial, industrial and home applications, in particular to monitor and control a variety of diverse types of operations. For example, in a manufacturing operation, the distributed control system 10 may, for example, control various machines and robots to facilitate manufacture of those components that are manufactured on site, and transfer of the components from inventory to assembly locations where they are assembled into the final product. In such an operation, the distributed control system 10 will also receive status information regarding the operational status of the various machines controlled by the system, as well as, for example, the inventory of the various components which may be used in manufacture of the end product and the assembly line, which status information the system 10 may use in controlling the rate of component manufacture and product assembly. Similarly, in a chemical processing operation, the distributed control system 10 may control the rates of flow of chemicals within the operation, as well as reaction parameters such as temperatures, pressures and the like of the chemical reaction chambers, with the control being exercised in response to corresponding status information the system 10 receives from the controlled components of the processing plant. In a commercial or home application, the distributed control system 10 may provide for the monitoring and control of a variety of environmental factors, including, for example, heating, air conditioning, ventilation, energy consumption and supply, and so forth.

The distributed control system 10 depicted in FIG. 1 provides for distributed control in a commercial, industrial or home environment operation. In the illustrative embodiment depicted in FIG. 1, the distributed control system 10 includes an area controller 11 and one or more field controllers 12(1) through 12(F) (generally identified by reference numeral 12(f)), which may be conveniently interconnected by a network 13 or other communications arrangement. The area controller 11 maintains overall control of the industrial operation under control, or a portion thereof, thereby maintaining overall control of the manufacturing process. Each of the field controllers 12(f), under control of the area controller, controls a portion of the plant, and in particular controls specific elements of the plant, such as specific machines (not shown) in a manufacturing operation or specific valves and reaction chambers in a chemical processing plant. In addition, each field controller 12(f) will receive status information preferably from sensors (also not shown) in its assigned portion of the plant which indicate their status in the process under control. Depending on the control information and operational parameters provided by the area controller 11 to a field controller 12(f), the field controller 12(f) may, in response to the status information it receives from the sensors connected thereto, control the machines to perform selected operations as determined by their programming. In addition, the field controller 12(f) may notify the area controller 11 if the status information indicates that operations in its area is outside of selected operational ranges, and the area controller 11 may initiate corrective procedures in connection therewith.

Figure 2A:
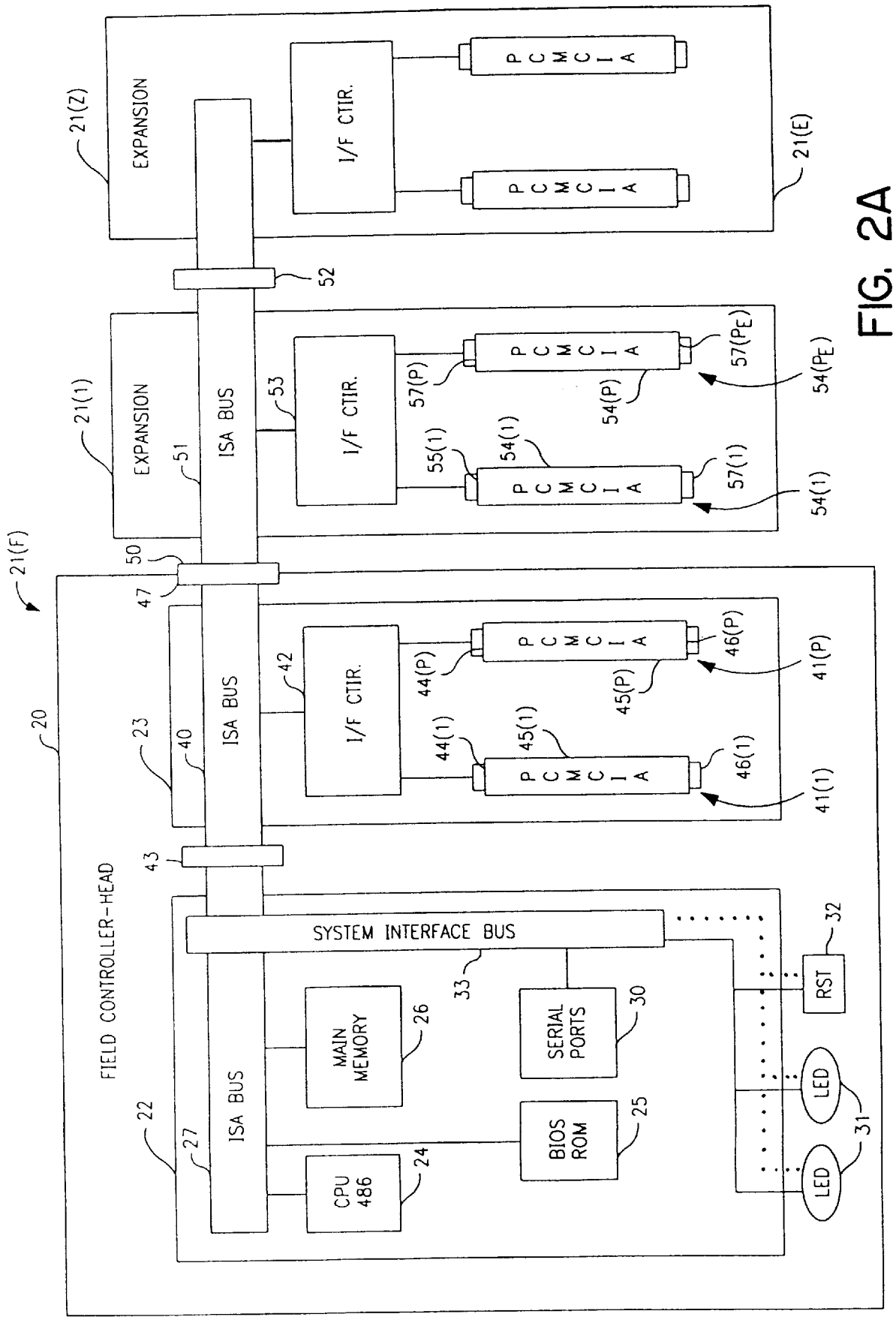
FIGS. 2A and 2B comprise functional block diagrams of the field controller subsystem useful in the distributed control system which is depicted in FIG. 1.
Figure 2B:
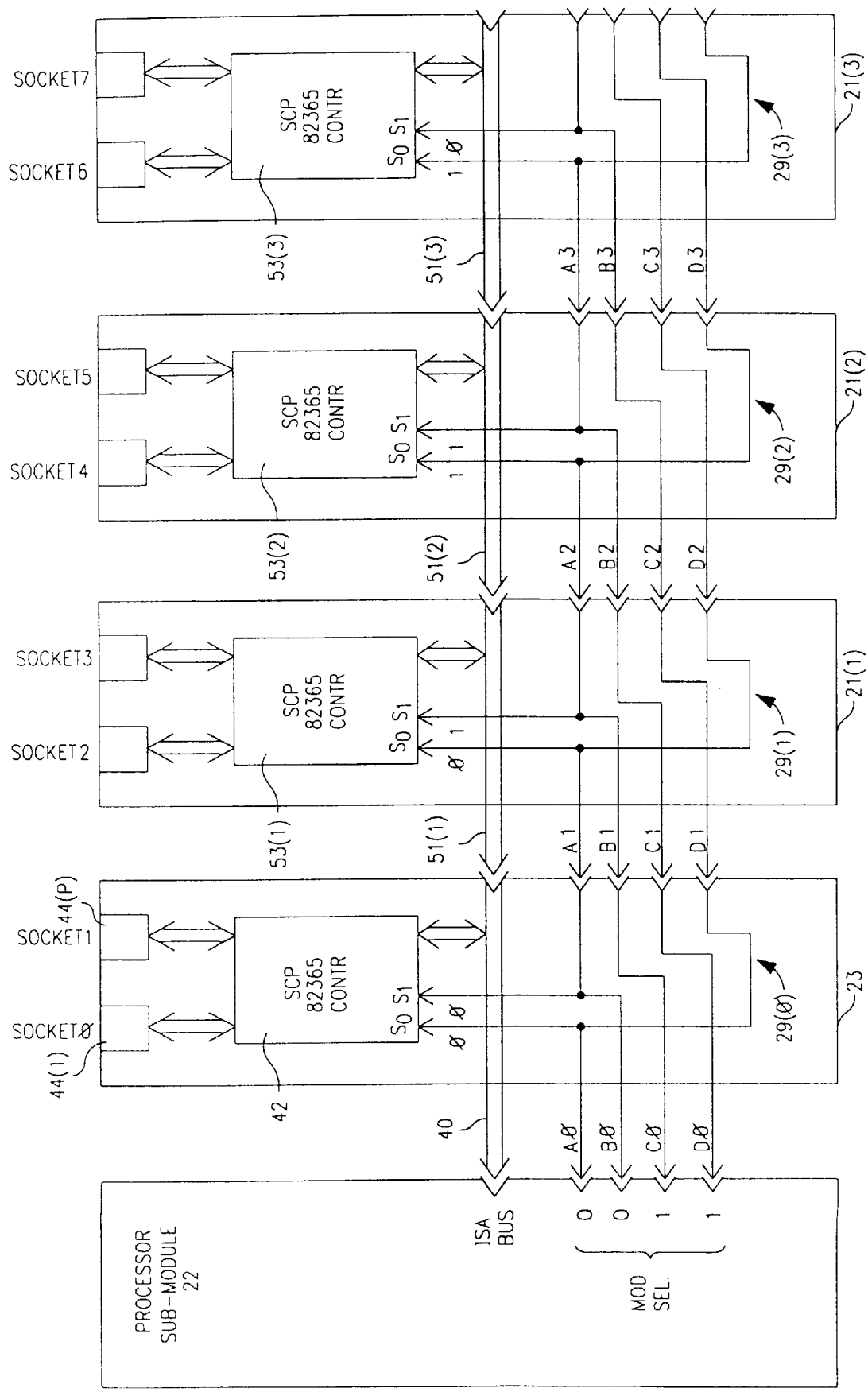

FIGS. 2A and 2B together depict a functional block diagram of a field controller 12(f) useful in the distributed control system 10. With reference initially to FIG. 2A, the field controller 12(f) comprises a plurality of modules, including a processor module 20 and one or more expansion modules 21(1) through 21(E) (generally identified by reference numeral 21(e)) whose electrical features are depicted in FIGS. 2A and 2B. Structural features of one embodiment of the field controller 12(f) will be described below in connection with FIGS. 3 through 6B, and structural features of a second embodiment of the field controller 12(f) will be described below in connection with FIGS. 7 through 10B. As will be described below, the modules 20 and 21(e) each have external connections which are positioned and configured to enable them to be connected together in a relatively compact manner. In addition, the modules 20 and 21(e) provide external interfaces to control devices in the factory environment. The entire field controller, comprising the processor module 20, one or more expansion modules 21(e), along with power supply and input/output devices which may be connected thereto (not shown) provides a very compact yet computationally-powerful and easily maintainable package, which is convenient and quite useful in an industrial environment.

The processor module 20 comprises a processor submodule 22 and a local communications submodule 23. The processor submodule 22, in turn, includes a central processor unit 24, a read-only memory 25 and a main random-access memory 26, all of which are connected to a bus segment 27, and may also include other components as described below. The central processor unit 24 is preferably in the form of a microprocessor. The read-only memory 25 provides non-volatile storage which may be used for, for example, a BIOS (basic input/output system) portion of the operating system program that controls the central processor unit 24, and may also provide storage for certain other fixed operating information. The main random-access memory 26, which may consist of one or more conventional DRAM (dynamic random-access memory) chips, provides storage for programs and data which may be down-loaded by the area controller 11 to enable the field controller 12(f) to operate, data received from the controlled devices and sensors controlled by the field controller 12(f), information processed by the central processor unit 24, and status information which may be retained for transmission to the area controller. In one embodiment, the bus segment 27 conforms to the well-known ISA bus specification, which defines a specification for buses used in personal computers, although it will be appreciated that bus segment 27 may conform to other multi-drop bus specifications.

In addition to components 24 through 26, the processor sub-module 22 may include one or more external communication ports (generally identified by reference numeral 30) for, for example, facilitating communications with the area controller 11, devices such as light-emitting diodes, generally identified by reference numeral 31, for providing visual status indications, and devices for receiving local control input, such as a reset signal provided by a reset button 32. The processor sub-module 22 may also include devices such as speakers (not shown) for generating audible alarm or status indications. All of these elements are indicated as being connected to the ISA bus segment 27 over an interface 33.

While the bus segment 27 has been described as conforming to the ISA bus specification, it will be appreciated that other types of busses may be used for the bus segment 27. Preferably, the bus segment 27 will be in the form of a "multi-drop" bus, that is, it will facilitate the interconnection of more than two devices to facilitate the transfer data and status information thereamong. In addition, the bus segment 27 will preferably provide an interrupt facility, by which the central processor unit 24 can receive interrupt requests from other devices that are connected to the bus to notify it of conditions that may occur on an asynchronous or non-periodic basis which require servicing by the central processor unit 24, as will be described below.

The processor sub-module 22 in one embodiment is preferably in the form of a single module having a form factor defined by the PCMCIA ("Personal Computer Memory Card International Association") standard, with dimensions generally 3⅜ inches long by 2⅛ inches wide, by ¼ inch deep, and having an ISA bus interface preferably along one of its long edges. A suitable processor sub-module 22 is currently sold by S-MOS Corporation as a model CARDIO™ 486 processor module, which provides the above-identified components and including an 80486-class microprocessor as the central processor unit.

The local communications sub-module 23 also includes a bus segment 40 and a plurality of PCMCIA interfaces 41(1) through 41(P) (generally identified by reference numeral 41($p$)), which are interconnected by an interface controller chip 42. The bus segment 40 of the local communications submodule 23 is logically similar to the bus segment 27 of the processor sub-module 22; that is, in the embodiment in which the processor submodule's bus segment 27 conforms to the ISA bus specification, the local communication sub-module's bus segment 40 will also conform to the ISA bus specification. The local communications sub-module's bus segment 40 connects to the processor sub-module's bus segment 27 through a downstream connector 43.

The interface controller chip 42 provides a connection from the bus segment 40 to the PCMCIA interfaces 41($p$). Each PCMCIA interface in turn, provides a connection to a PCMCIA device, that is, a device which conforms to the electrical interface defined by the PCMCIA specification identified above ("PCMCIA" cards are also referred to within the computing industry as "PC Cards", and the term "PCMCIA" is used herein to refer to both.). The PCMCIA specification defines, in addition to the PCMCIA form factor described above, an electrical interface which is essentially a point-to-point bus, that is, a bus which interconnects only two devices. (This is in contrast to the ISA bus specification which, as described above, defines a multi-drop bus, which can interconnect more than two devices.) Each PCMCIA interface 41($p$) includes an interface connector 44($p$) which connects to the interface controller chip 42, an interface card 45($p$), and an external interface 46($p$) which provides an interface to a controlled device (not shown) which may be located in the industrial environment, as described above. The interface card 45($p$) is preferably constructed in the PCMCIA form-factor as described above, and provides circuitry which converts between PCMCIA signals provided by the interface controller chip 42 and signals transmitted to and received from the controlled device or sensor connected to the card 45($p$). It will be appreciated that the particular circuitry provided in each interface card 45($p$) will generally depend on the particular controlled device or sensor to which the card 45($p$) is connected.

As described above, the processor module 20 provides an interface to two controlled devices through the local communications sub-module 23. To increase the number of devices which may be controlled by the local controller, one or more expansion modules 21($e$) may be connected to the processor module 20. In particular, the local communications sub-module 23, in addition to providing a connector 43 to the processor module 22, also provides an upstream connector 47, which may be connected to an expansion module 21(1), as shown in FIG. 2.

Figure 3:
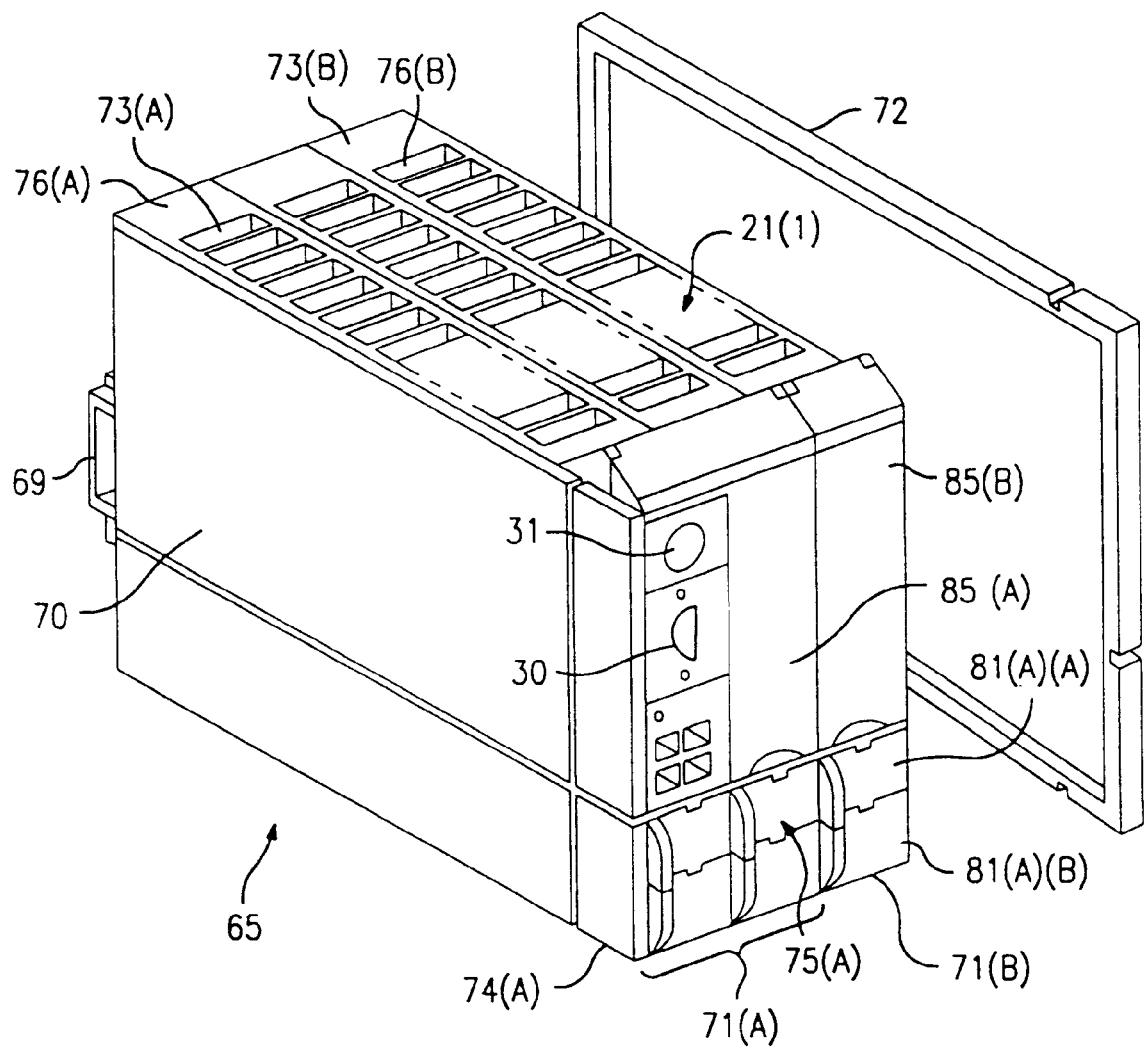
FIGS. 3 and 4 are views of one embodiment of the physical structure of the field controller depicted in FIGS. 2A and 2B.

The expansion module, the physical structure of which will be described below in connection with FIGS. 3, 6A and 6B, is electrically and logically similar to the local communications sub-module 23. That is, it is provided with a downstream connector 50, a bus segment 51, an upstream connector 52, an interface controller chip 53 and a plurality of PCMCIA interfaces 54(1) through 54($p_e$) (generally identified by reference numeral 54($p_e$)) which include an interface connector 55($p$) which connects to the interface controller chip 53, an interface card 56($p$), and an external interface 57($p$) which provides an interface to a controlled device (not shown) which may be located in the industrial eironment, as described above. In one embodiment, the maximum number of PCMCIA interfaces 54($p_e$) that may be connected in an expansion controller corresponds to the number of PCMCIA interfaces 41($p$) which can be connected in the processor sub-module 20 is two, but it will be appreciated that an expansion module 21($e$) may provide more or fewer interfaces than the processor module 20.

The downstream connector 50 of the first expansion module 21(1) connects to the external connector 47 of the processor module 20, to connect the bus segment 51 of the first expansion module 21(1) to the bus segment 40 of the local communications submodule 23, and thus to facilitate the transfer of signals from the processor sub-module 22 to the first expansion module 21(1). The bus segment 51 couples the signals from the downstream connector 50 to the upstream connector 52 for transfer to a further expansion module 21(2), if one is provided in the field controller 12($f$). As in the local communications sub-module 23, the interface controller chip 53 couples signals between the bus segment 51 and the PCMCIA interfaces 54($p_e$) which are provided in the first expansion module 21(1).

As noted above, the expansion modules 21($e$) are all electrically similar (and are similar to the local communications sub-module 23 as described above). Accordingly, for each expansion module 21($e$) after the first, the respective downstream connector 50($e$) will connect to the upstream connector 50($e$−1) of the preceding expansion module 21($e$−1) in the series, and the upstream connector 50($e$) will connect to the downstream connector 50($e$+1) of the next expansion module 21($e$+1) in the series, with the module's bus segment 51($e$) coupling signals between the downstream connector 50($e$) and the upstream connector 52($e$). The interface controller chip 53($e$) in the respective expansion module 21($e$) connects to the bus segment 51 and the PCMCIA interfaces 54($p_e$) allowing the expansion module 21($e$) to connect to a number of controlled devices over respective PCMCIA interfaces (not shown). Since for each expansion module 21($e$) the bus segments 27 . . . 40 . . . 51($e$), interconnected by respective connectors 43, 47, 50(1), 52(1), 50($e$), 52($e$), provide a continuous path for carrying data and control signals from the central processor unit 24 of the processor sub-module 22 to the respective local communications sub-module 23 and expansion module 21($e$), the central processor unit 24 is able to control the controlled device(s) through the PCMCIA interfaces 45($p$) (in the case of a controlled device connected to the local communications sub-module 23) or 54($p_e$) (in the case of a controlled device connected to an expansion module 21($e$).

As noted above, the expansion modules 21($e$) and local communications sub-module 23 are all electrically similar. The field controller 12($f$) further includes a module selection arrangement, which will be described in connection with FIG. 2B whereby the processor sub-module 22 can select which of the local communications sub-module 23 or expansion module 21(e) is to receive signals transmitted by it (that is, the processor sub-module 22) on the respective bus segments 27 . . . 40 . . . 51(e), or which of the local communications sub-module 23 or expansion module 21(e) is to transmit signals to it (that is, the processor submodule 22) onto the respective bus segments 27 . . . 40 . . . 51(e). With reference to FIG. 2B, in connection with the module selection arrangement, the processor submodule 22 generates a plurality of MOD SEL module selection signals for transmission through a set of connectors 28(A) through 28(D), with processor sub-module 22 controlling the pattern of asserted and negated signals so as to select one of the local communications sub-module 23 or an expansion module 21(e). Each of the local communications sub-module 23 and the expansion modules 21(e), in turn, includes a selection signal select and rotation network 29(0) through 29(3) that (a) selects a predetermined pattern of the signals for use in controlling selection of the local communications sub-module 23 and expansion modules 21(e), and (b) rotates the signal pattern for transmission to the next local communications sub-module 23 or expansion module 21(e) in the series of the local communications sub-module 23 or expansion modules 21(e).

In the embodiment depicted in FIG. 2B, in which one local communications sub-module 23 and three expansion modules 21(e) are provided, the four MOD SEL module selection signals are provided, labeled A0, B0, C0 and D0. In that embodiment, the local communications sub-module 23, which is connected directly to the processor sub-module 22, receives the MOD SEL module selection signals A0, B0, C0 and D0, and decodes the A0 and B0 signals. If the processor sub-module 22 is asserting both the MOD SEL module selection signals A0 and B0, the local communications sub-module 23 will determine that it is the "selected" module for communications over the bus segment 40. In any case, the local communications sub-module 23 will rotate the MOD SEL module selection signals so that the signals A0, B0, C0 and D0 will be coupled to the expansion module 21(1) as the signals D1, A1, B1 and C1.

The expansion module 21(1) uses the module selection signals A1 and B1 to determine whether it is the "selected" module for communications over the bus segment 51(1). As described above, the module selection signals A1 and B1 as received by the expansion module 21(1), in turn, correspond to MOD SEL module selection signals B0 and C0, respectively, as generated by the processor sub-module 22. Accordingly, if the processor sub-module 22 asserts the signals B0 and C0, the expansion module 21(1) will determine that it is the "selected" module for communications over the bus segment 51(1). In any case, the expansion module 21(1) will rotate the MOD SEL module selection signals so that the signals A1, B1, C1 and D1 will be coupled to the expansion module 21(2) as the signals D2, A2, B2 and C2.

Similarly, the expansion module 21(2) uses the module selection signals A2 and B2 to determine whether it is the "selected" module for communications over the bus segment 51(2). As described above, the module selection signals A2 and B2 as received by the expansion module 21(2), in turn, correspond to MOD SEL module selection signals C0 and D0, respectively, as generated by the processor sub-module 22. Accordingly, if the processor sub-module 22 asserts the signals C0 and D0, the expansion module 21(2) will determine that it is the "selected" module for communications over the bus segment 51(2). In any case, the expansion module 21(2) will rotate the module selection signals so that the signals A2, B2, C2 and D2 will be coupled to the expansion module 21(3) as the signals D3, A3, B3 and C3.

Finally, the expansion module 21(3) uses the module selection signals A3 and B3 to determine whether it is the "selected" module for communications over the bus segment 51(3). As described above, the module selection signals A3 and B3 as received by the expansion module 21(3), in turn, correspond to MOD SEL module selection signals D0 and A0, respectively, as generated by the processor sub-module 22. Accordingly, if the processor sub-module 22 asserts the signals D0 and A0, the expansion module 21(3) will determine that it is the "selected" module for communications over the bus segment 51(3).

While FIG. 2B depicts selection of the local communications sub-module 23 or one of three expansion modules 21(1) through 21(3) using four MOD SEL module selection signals A0, B0, C0 and D0 as generated by the processor sub-module 22, by means of selection networks 29(0) through 29(3) as depicted in the FIG., it will be appreciated that, by suitable modification which will be readily apparent to those skilled in the art, module selection signals and selection networks may be provided by which more or fewer modules may be selected.

The field controller 12(f) which is logically depicted in FIGS. 2A and 2B, provides an architecture which may be conveniently implemented in a compact package which is readily installable and maintainable in a factory environment. One embodiment of such an implementation will be described in connection with FIGS. 3 through 6B, and a second embodiment will be described in connection with FIGS. 7 through 10B. The embodiment depicted in FIGS. 3 through 6B may be mounted on, for example, a vertical support such as a wall, with the processor module 20 and each expansion module 21(e) being generally configured so that, when an expansion module is added to the field controller 12(f), it will be connected to the processor module 20 or to previously-provided expansion modules so as to extend the field controller 12(f) in a direction which is generally parallel to a plane of the vertical support. The embodiment depicted in FIGS. 7 through 10B may also be mounted on a vertical support, but the processor module 20 and expansion modules 21(e) are generally configured so that, when an expansion module 21(e) is added to the field controller, it will be connected to the processor module 20 or to previously-provided expansion modules so as to extend the field controller 12(f) in a direction which is generally transverse to a plane of the vertical support.

Figure 4:
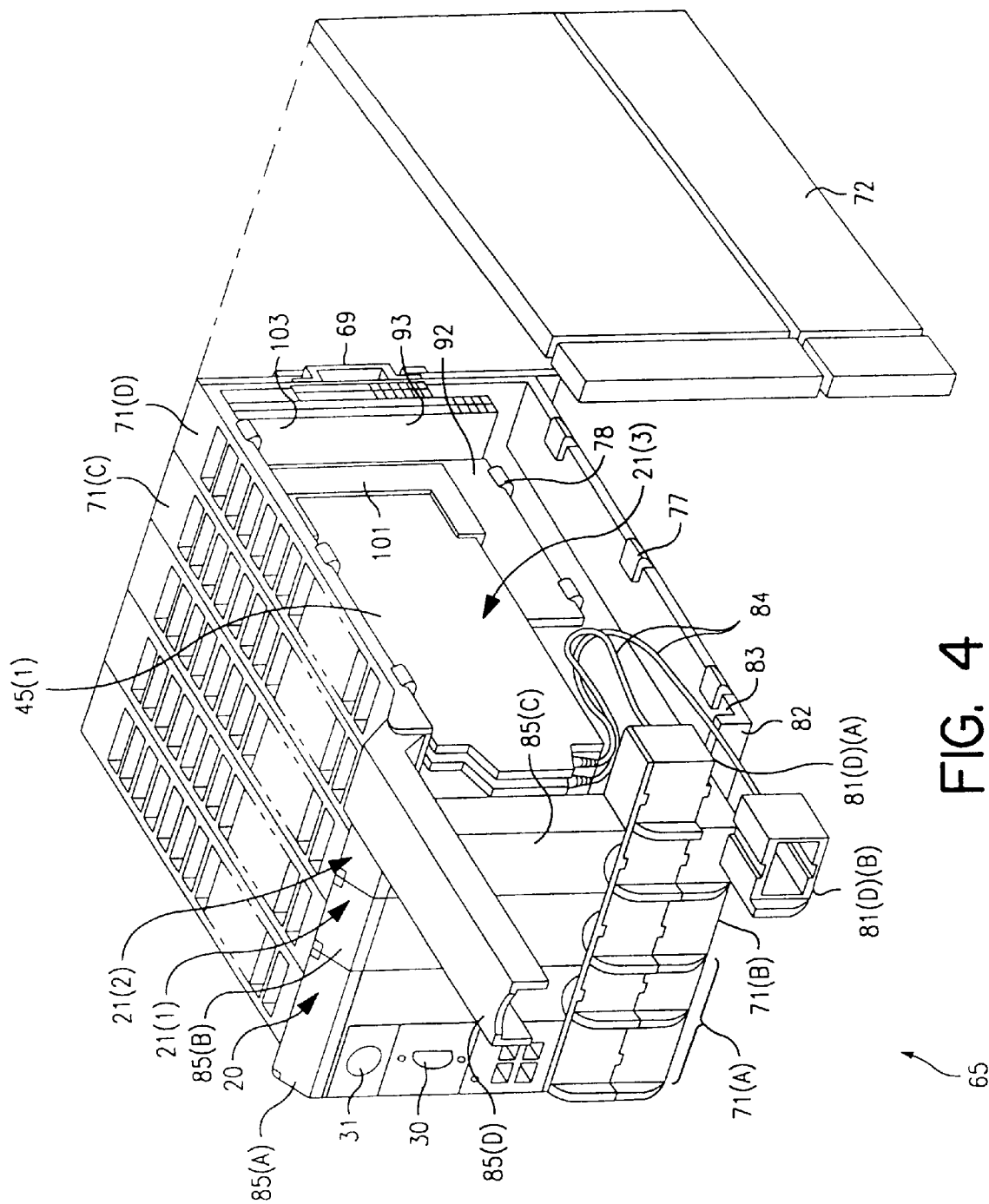
Figure 5A:
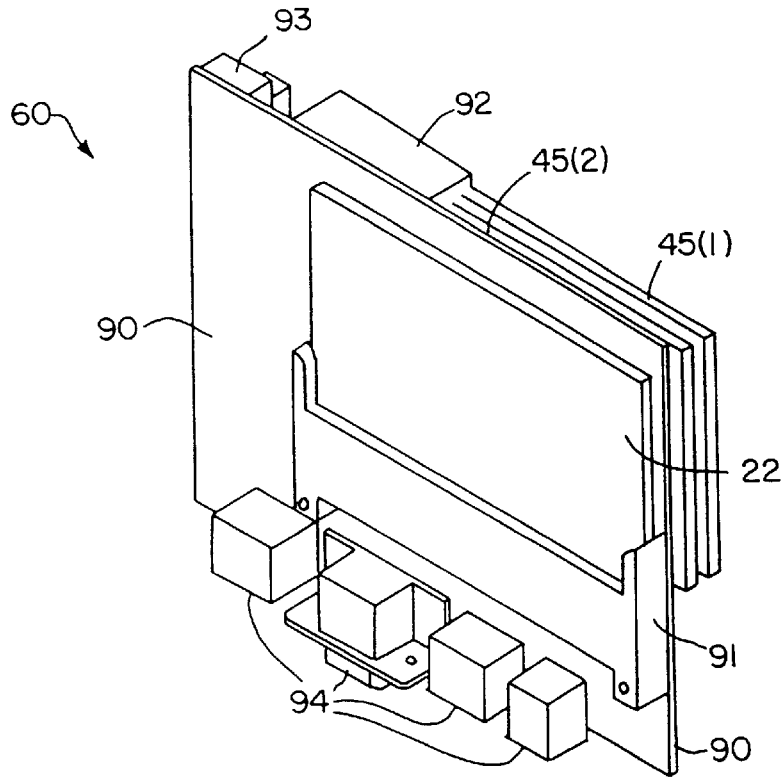
FIGS. 5A and 5B depict the physical structure of a processor module circuit structure which is useful in the field controller depicted in FIGS. 3 and 4.
Figure 5B:
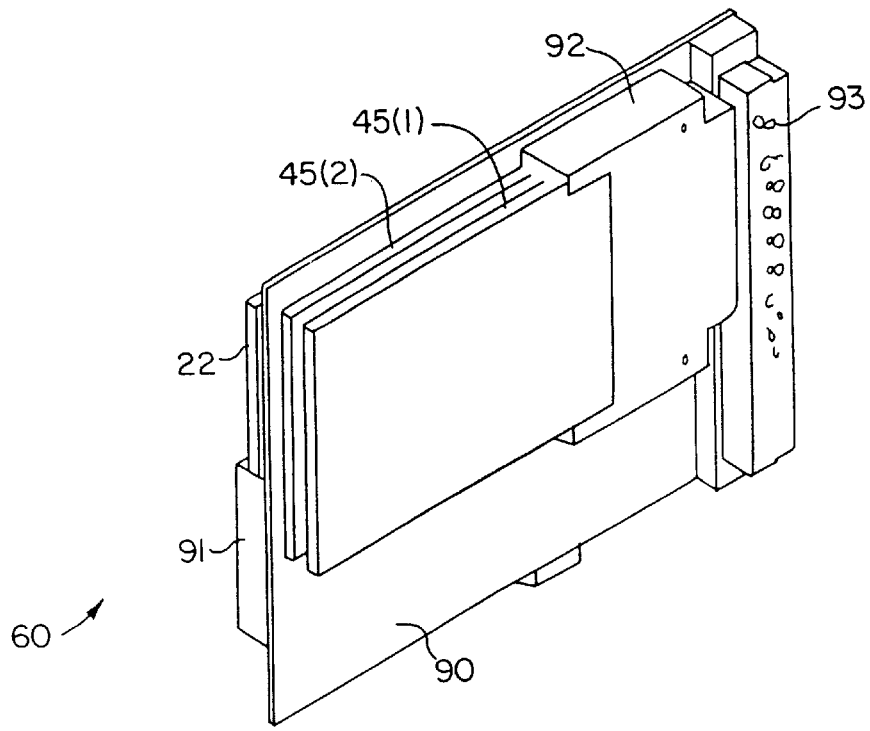

With reference initially to FIGS. 3 and 4, those FIGS. depict perspective views of field controllers 12($f_A$) and 12($f_B$) from two diverse orientations, with FIG. 3 particularly depicting the processor module 20 component of the field controller 12($f_A$) and FIG. 4 particularly depicting an expansion module 21(e) of field controller 12($f_B$). The field controllers 12($f_A$) and 12($f_B$) depicted in FIGS. 3 and 4 are generally similar except that field controller 12($f_A$) includes a processor module 20 and one expansion module 21(1), whereas field controller 12($f_B$) includes a processor module 20 and three expansion modules 21(1) through 21(3). (Since the field controllers 12($f_A$) and field controller 12($f_B$) are otherwise similar, they will be generally identified hereinafter by reference numeral 12(f).) FIGS. 5A and 5B depict opposing sides of the physical structure 60 of an electronic circuit useful in the processor module 20 and FIGS. 6A and 6B depict opposing sides the physical structure 61 of an electronic circuit useful in the expansion module 21(e). It will be appreciated that the processor module circuit structure 60 constitutes an implementation of the circuit elements of the processor module 20 described above in connection with the schematic diagram in FIG. 2, and the expansion module circuit structure 61 constitutes an implementation of the circuit elements of an expansion module 21(e) described above in connection with the schematic diagram in FIG. 2.

With reference to FIGS. 3 through 6B, the field controller 12(f) includes a housing 65 having a rear mounting bracket 69 for mounting the field controller 12(f) onto a surface such as a wall or the like. The housing includes a left end cap 70 (shown in FIG. 3), a series of segments 71(A) through 71(D) (generally identified by reference numeral 71(s)) and a right end cap 72. (FIG. 3 depicts only segments 71(A) and 71(B)), and FIG. 4 depicts all four segments 71(A) through 71(D)). The segment 71(A) is dimensioned to fit the processor module circuit structure 60, and each of the other segments 71(B) through 71(D) is dimensioned to fit an expansion module circuit structure 61. Each of the segments 71(s) comprises upper, lower, front and rear enclosure elements 73(s) through 76(s), respectively, (lower and rear enclosure elements 74(s) and 76(s) are not shown in the FIGS.) which snap together laterally (that is, open-end to open-end) to, with the end caps, form contiguous elements of a continuous enclosure. Snap fastening elements generally identified by reference numeral 77 are provided to fasten the segments 71(s) and end caps 70 and 72 together.

It will be appreciated from the description below that, in the embodiment depicted in FIGS. 3 and 4, the left end cap 70 may be provided integrally with the segment 71(A) for the processor module circuit structure 60, whereas the right end cap is provided separately from any of the segments 71(s) and added to the rightmost segment. This results from the fact that, in that embodiment, segments are added to the right of the processor module segment 71(A). Since the left end cap 70 will always be provided for the processor module segment, it is preferably provided integrally with the segment 71(A).

As described above, each segment 71(s) includes upper, lower, forward and rear enclosure elements 73(s) through 76(s), respectively, comprising the sidewalls for the segment 71(s). The lower and rear enclosure elements 75(s) and 76(s) are preferably generally planar elements, although the rear enclosure elements 76(s) may also be provided with a fastener to receive a conventional DIN mounting rail 77. The upper enclosure elements 73(s) are preferably in the form of a finned heat sink to facilitate dissipation of thermal energy which will be generated by the electronic circuit elements which contained within the enclosure. The forward enclosure elements 75(s) for the respective segments preferably includes a number of components, including an access door 80(s) and a recess 82(s) (recess 82(D) is particularly shown in FIG. 4) for receiving one or more external connectors 81(s)(A) and 81(s)(B). The access doors 80(s) are hinged at the top and open upwardly to provide access to the respective modules 20 or 21 contained therein to facilitate insertion of components or removal for maintenance as described below. In addition, the access door 80(A) of the processor module segment 71(A) includes a connector for the external communication port 30, the visual status indicators 31 and reset button 32, and may also include connectors for audible alarm indicators (not shown).

As described above, the processor module segment 71(A) is preferably configured and dimensioned to receive the processor module circuit structure 60 and each expansion module segments 71(B) through 71(D) is preferably configured and dimensioned to receive an expansion module circuit structure 61. The structure of the processor module circuit structure 60 useful in one embodiment will be described in connection with FIGS. 5A and 5B, and the structure of the expansion module circuit structure useful in the same embodiment will be described in connection with FIGS. 6A and 6B. With reference initially to FIGS. 5A and 5B, the processor module circuit structure 60 includes a circuit board 90 having mounted on one side thereof a connector 91 for receiving the processor sub-module 22 and on the other side a connector 92 for receiving the PCMCIA interface cards 45(1) and 45(2). The bus segment 27 in the processor sub-module 22 is internal to the processor sub-module itself, and is not depicted in FIGS. 5A and 5B. The circuit board 90 will be provided with traces (not shown) that electrically interconnect the connectors 91 and 92 and an off-board connector 93 (shown particularly in FIG. 5B), to carry signals among the processor sub-module 22 and PCMCIA interface cards 45(1) and 45(2). It will be appreciated that the connector 91 and circuit board traces generally correspond to the connector 43 and bus segment 40 depicted in FIG. 2, and the connector 92 generally corresponds to the connectors 44(1) and 44(P) shown in FIG. 2. In addition, the off-board connector 93 generally corresponds to the upstream connector 47 in FIG. 2. Circuit board 90 is also provided with connectors and the like, generally identified by reference numeral 94, for connecting the serial port 30, visual status indicators 31 and reset button 32 located on the access door 85(A), and for connecting the circuit board 90 to a power supply (not shown).

As shown in FIGS. 5A and 5B, the connectors 91 and 92 are configured so that the processor sub-module 22 and PCMCIA interface cards 45(1) and 45(2) will be positioned generally parallel to the circuit board 90 so as to provide a relatively thin package that may be conveniently positioned in the segment 71(A) generally parallel to the left end cap 71 with the off-board connector 93 being positioned toward the rear enclosure element 96(A). The off-board connector 93 corresponds to the connector 47 (FIG. 2) and facilitates the connection between the processor module 20 and an expansion module 21(1). Preferably, the off-board connector 93 provides pins and/or receptacles that are oriented generally transversely to, and towards the right of (as shown in FIGS. 5A and 5B) the plane of the circuit board 90.

With reference to FIGS. 6A and 6B, the expansion module circuit structure 61 also includes a circuit board 100 having mounted on one side thereof a connector 101 for receiving the PCMCIA interface cards 54(1) and 54(2), and in addition includes off-board connectors 102 and 103. The connector 101 is configured so that the PCMCIA interface cards 54(1) and 54(2) will be positioned generally parallel to the circuit board 90 so as to provide a relatively thin package that may be conveniently positioned in a segment 71(s) (other than the segment 71(A) for the processor module 20) with the plane of the circuit board 100 being generally parallel to the plane of the circuit board 90. Off-board connector 102, which is situated on the left of (as shown in FIGS. 6A and 6B) circuit board 100, includes pins and/or receptacles which are oriented generally transversely to the plane of the circuit board 100, and which mate with corresponding elements of the off-board connector 93 of the processor module circuit structure 90 (FIGS. 5A and 5B).

Off-board connector 103, which is situated to the right of (as shown in FIGS. 6A and 6B) circuit board 100 is similar to the off-board connector 93 of the processor sub-module, and also provides pins and/or receptacles that are oriented generally transversely to the plane of the circuit board 100. Since the off-board connector 103 is similar to off-board connector 93, and since the off-board connector 102 will mate with the off-board connector 93 of the processor module 22, the off-board connectors 102 of each successive expansion module 21($e_B$), 21($e_C$), . . . , will also mate with the off-board connectors 103 of the respective previous expansion module 21($e_A$), 21($e_B$), . . . , in the series of expansion modules 21($e$), thereby to accommodate addition of expansion modules as described above. It will be appreciated that the off-board connector 102 effectively corresponds to the downstream connector 50 of expansion module 21($e$) as described above, and the off-board connector 103 effectively corresponds to its upstream connector 52. The bus segment 51 will correspond to connections between the off-board connectors 102 and 103 on the circuit board as well as to electrically-conductive traces interconnecting the connectors 102/103 and the PCMCIA connector 101.

Returning to FIGS. 3 and 4, as noted above, the processor module circuit structure 60 and the expansion module circuit structure(s) 61 both snap into respective segments 71($s$) of the housing 65. Each segment 71($s$) is provided with snap fastening elements 78 (shown in FIG. 4) to engage the edges of the respective circuit boards 90 (in the processor module segment 71(A) and 100 (in the expansion module segrnents 71(B) through 71(D). In addition, as shown particularly in FIG. 4, each PCMCIA interface card 45(1)/45(2) may be connected to an external connector 81($s$)(A) or 81($s$)(B) by means of wires, such as wires 84, extending from the interface card, which may extend exteriorly of the segment through a slot 83($s$) formed in the recess 82($s$).

Since the field controller 12($f$) as described above in connection with FIGS. 2 through 6B is modular, it provides a compact, expandable, easily-constructed and easily-maintainable arrangement. The field controller 12($f$) may be readily assembled by snapping the processor module circuit structure 60 (FIGS. 5A and 5B) in the segment 71(A) and any expansion module circuit structures 61 that may be required for a particular field controller 12($f$) in corresponding segments 71(B), 71(C), and so forth. The external connector 30, reset switch 32 and external indicator 31 may be mounted on the access door 75(A) of segment 71(A), and the external connectors 81($s$)(A)/81($s$)(B) may be mounted in the recesses 82($s$) of the respective segments 71($s$) and connected to the PCMCIA interface cards therein. Thereafter, the respective connectors 93 (of processor module circuit structure 60) and connectors 102 and 103 (of expansion module circuit structure 61) will be in registration so that, when the segments are snapped together, the downstream connector 102 of the expansion module circuit structure 61 in a segment 71(B), 71(C), 71(D), . . . , will be in secure electrical contact with the connector 93 of the processor module circuit structure 60 in segment 71(A) or the upstream connector 103 of the expansion module circuit structure 61 in segment 71(B), 71(C), . . . . After the last segment 71($s$) has been added, the right end cap 72 may be snapped into place to complete the enclosure for the field controller 12($f$).

It will be appreciated that a field controller can be readily expanded in the field by simple upgrading of the processor sub-module 22 and by the easy addition of expansion modules 21($e$). Addition of expansion modules 21($e$) can be readily accomplished by unsnapping of the end cap 72 and snapping a new segment 71(S+1) onto the left-most segment 71(S). Since the newly-added segment's off-board connector 102 is ensured to be in registration with the connector 103 of the segment 71(S) onto which it is being mounted, the new segment 71(S+1) is ensured to be properly electrically connected to the segment 71(S) and to all of the segments 71(A), . . . , 71(S−1) downstream thereof. Since the PCMCIA interface cards effectively communicate with the processor sub-module 22 over a bus comprising a series of bus segments, the PCMCIA interface cards connected to particular controlled elements in the factory environment can be placed in any segment 71($s$).

It will be appreciated that the field controller 12($f$) can be readily serviced in the field. The access doors 75($s$) in particular of the respective segments 71($s$) provide ready access to the PCMCIA interface cards 45($p$) and 56($p$) for service. The processor sub-module 22, and the PCMCIA interface cards can be individually removed and replaced in the field as necessary in the event of an upgrade or a malfunction through the access doors and without otherwise requiring disassembly.

Figure 7:
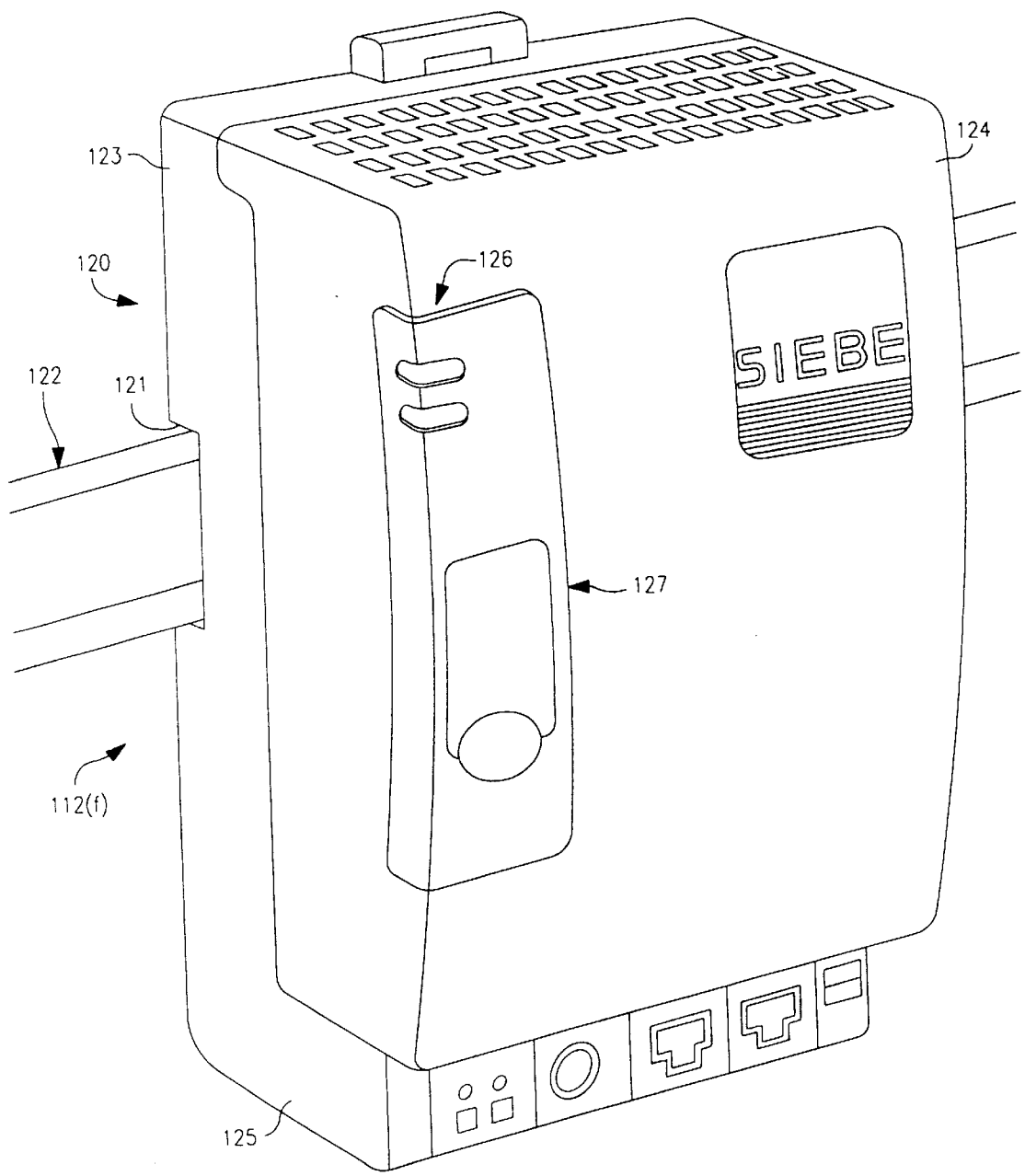
FIGS. 7 and 8 depicts views of a second embodiment of the physical structure of the field controller depicted in FIGS. 2A and 2B.
Figure 8:
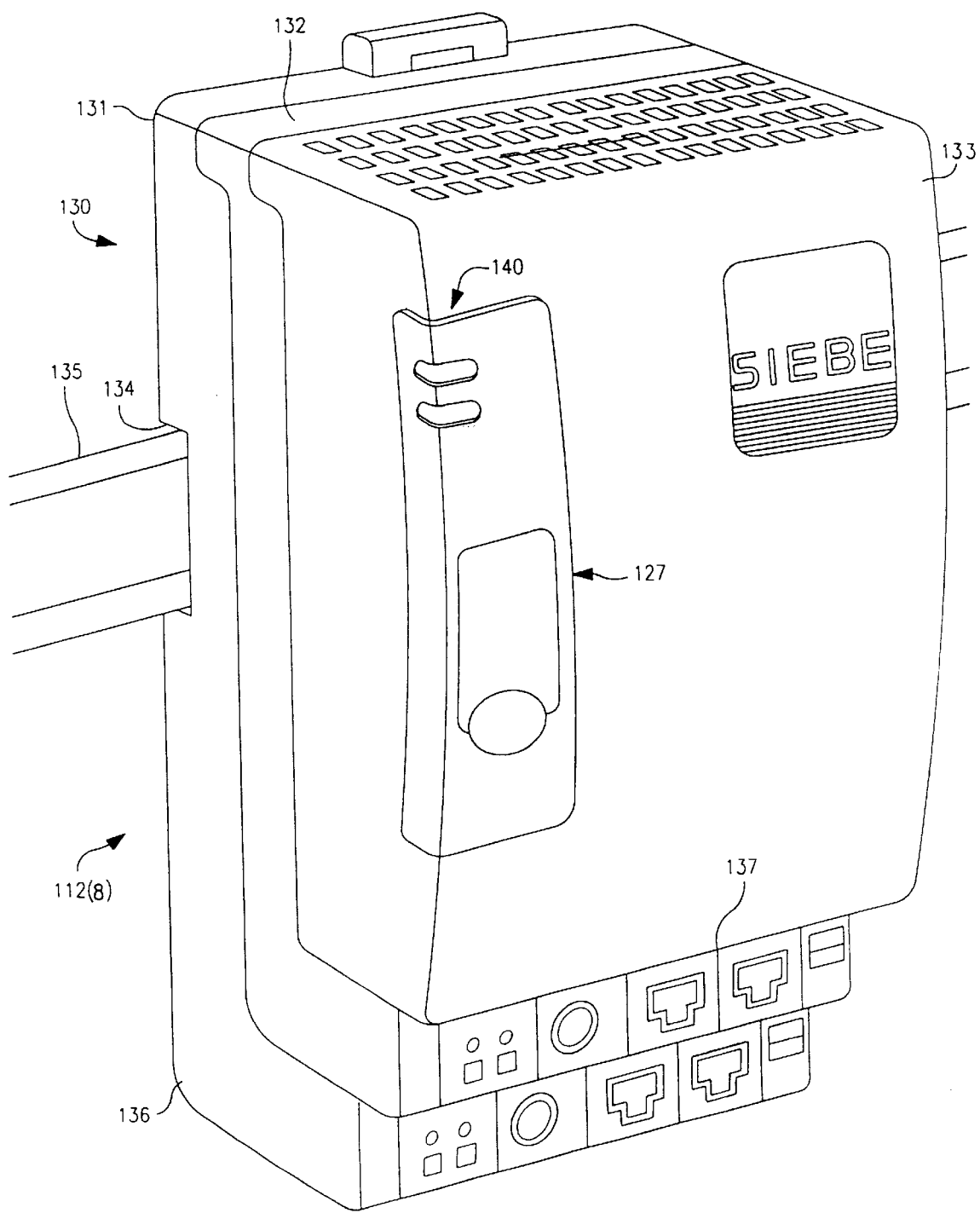

As noted above, FIGS. 7 through 10B depict a second embodiment of the field controller 12($f$), identified herein by reference numeral 112($f$), in which the processor module 20 and expansion modules 21($e$) are generally configured so that, when an expansion module 21($e$) is added to the field controller, it will be connected to the processor module 20 or to previously-provided expansion modules so as to extend the field controller 12($f$) in a direction which is generally transverse to a plane of the vertical support. FIG. 7 depicts a field controller 112($f$) having a processor module 20. (In the embodiment described in FIGS. 7 through 10B, the processor module 20 includes a processor sub-module 22 and two local communication sub-modules, one of which corresponds to the local communication sub-module 23 depicted in FIG. 2A, and the second local communication sub-module corresponding to the first expansion module 21(1) depicted in FIG. 2A.) FIG. 8 depicts a field controller 112($f$)' having a processor module similar to the processor module 20 of the field controller depicted in FIG. 7, and two expansion modules 21($e$), which correspond to expansion modules 21(2) and 21(3) depicted in FIGS. 2A and 2B.

With reference to FIG. 7, the field controller 112($f$) depicted in that FIG. comprises a housing 120 having a rear support member 123 and a cover 124. The rear support member 123 includes bracket 121 for mounting on a surface such as a wall or the like. In one particular embodiment, the bracket 121 couples onto a conventional DIN rail identified by reference numeral 122, which, in turn, may be mounted on a surface (not shown), but it will be appreciated that other mounting arrangements may be provided for mounting the field controller 112($f$).

As shown in FIG. 7, the rear support member 123 includes forwardly-extending base member 125 that includes a power connector, reset button and external connectors which are similar to the corresponding elements 31 and 81($s$)($t$) described above in connection with the embodiment depicted in FIGS. 3 through 6B. The cover 124 includes a light-emitting diode status display 126 which comprises lenses for light-emitting diodes for providing visual information concerning the status of the field controller 112($f$), in particular whether the field controller 112($f$) is powered-up and whether it is functioning properly or requires servicing. In addition, the field controller 112($f$) includes an access door which provides external access to an interior connector corresponding to connector 30 described above in connection with the embodiment depicted in FIGS. 3 through 6B. As noted above, the field controller 112($f$) depicted in FIG. 7 includes a single processor module circuit structure 150, which, as will be described below in connection with FIGS. 9A and 9B, comprises a single circuit board having a processor sub-module 22 mounted on one side of the circuit board and two PCMCIA interface cards 45(1) and 45(2)

mounted on the opposing side of the circuit board, with the planes of the processor sub-module 22 and PCMCIA interface cards being parallel to the plane of the circuit board. The processor module circuit structure 150 is mounted interiorly of the housing 120, in particular being supported by the rear support member 123, with the rear support member 123 supporting the processor module 20 so that the plane of its circuit board generally parallel to the rear support and mounting surface on which the field controller 112(f) is mounted. Wires interconnecting the respective elements of the processor module circuit structure 150 and external connectors are routed interiorly of the housing 120.

As described above, FIG. 8 depicts a field controller 112(f)' having a processor module circuit structure 150 similar to the processor module circuit structure 150 of the field controller depicted in FIG. 7, and two expansion module circuit structures 160, which correspond to expansion modules 21(2) and 21(3) depicted in FIGS. 2A and 2B. With reference to FIG. 8, the field controller 112(f) depicted in that FIG. comprises a housing 130 having a rear support member 131, an intermediate member 132 and a cover 133. The rear support member 131 includes a rear bracket 134 for mounting on a surface such as a wall or the like. In one particular embodiment, the bracket 134 couples onto a conventional DIN rail identified by reference numeral 135, which, in turn, may be mounted on a surface (not shown), but it will be appreciated that other mounting arrangements may be provided for mounting the field controller 112(f)'.

As shown in FIG. 8, the rear support member 131 includes forwardly-extending base member 136 that includes a power connector, reset button and external connectors which are similar to the corresponding elements 31 and 81(s)(t) described above in connection with the embodiment depicted in FIGS. 3 through 6B. The intermediate member 132 is generally similar to the rear support member 123 of the field controller 112(f) (except that it does not provide the mounting bracket 121 provided by rear support member 123), and provides a forwardly-extending base member 137 that, in a manner similar to base member 125 (FIG. 7), provides connectors and a reset button. The rear support member 131 is generally similar to support member 123 of the field controller 112(f) depicted in FIG. 7, except that it is somewhat longer so that the base member 136 will extend forwardly beneath the base member 137 of the intermediate member. The base members 137 and 136 are preferably stepped (that is, the forward surface of base member 136 is somewhat rearward of the forward surface of base member 137) so that wires connected to the connectors of the respective base members 136 and 137 to provide for a relatively neat routing of the wires.

The cover 133 is generally similar to the cover 125 of the field controller 112(f) depicted in FIG. 7. In particular, the cover 133 includes a light-emitting diode status display 140 which comprises lenses for light-emitting diodes for providing visual information concerning the status of the field controller 112(f)', in particular whether the field controller 112(f)' is powered-up and whether it is functioning properly or requires servicing. In addition, the field controller 112(f)' includes an access door which provides external access to an interior connector corresponding to connector 30 described above in connection with the embodiment depicted in FIGS. 3 through 6B. As noted above, the field controller 112(f)' depicted in FIG. 7 includes a single processor module 20 and one or more expansion modules 21(e). The processor module circuit structure 150 used in field controller 112(f)' corresponds to the module to be described below in connection with FIGS. 9A and 9B, and the expansion modules 21(e) will be described below in connection with FIGS. 10A and 10B. As with the processor module circuit structure 150 used in the field controller 120, the processor module circuit structure used in field controller 112(f)' comprises a single circuit board having a processor sub-module 22 mounted on one side of the circuit board and two PCMCIA interface cards 45(1) and 45(2) mounted on the opposing side of the circuit board, with the planes of the processor sub-module 22 and PCMCIA interface cards being parallel to the plane of the circuit board. Similarly, each expansion module circuit structure 160 comprises a single circuit board having two PCMCIA interface cards 54(1) and 54(2) mounted on one side thereof, with the planes of the PCMCIA interface cards being parallel to the plane of the circuit board. The processor module 20 and expansion modules 21(e) are all mounted interiorly of the housing 130, in particular being supported by the rear support member 131, with the rear support member 131 supporting the processor module circuit structure 150 and expansion module circuit structures 160 so that the planes of their circuit board are generally parallel to the rear support and mounting surface on which the field controller 112(f)' is mounted. Wires interconnecting the respective elements of the processor module circuit structure 150 and expansion module circuit structures 160, and external connectors, are routed interiorly of the housing 130.

Figure 9A:
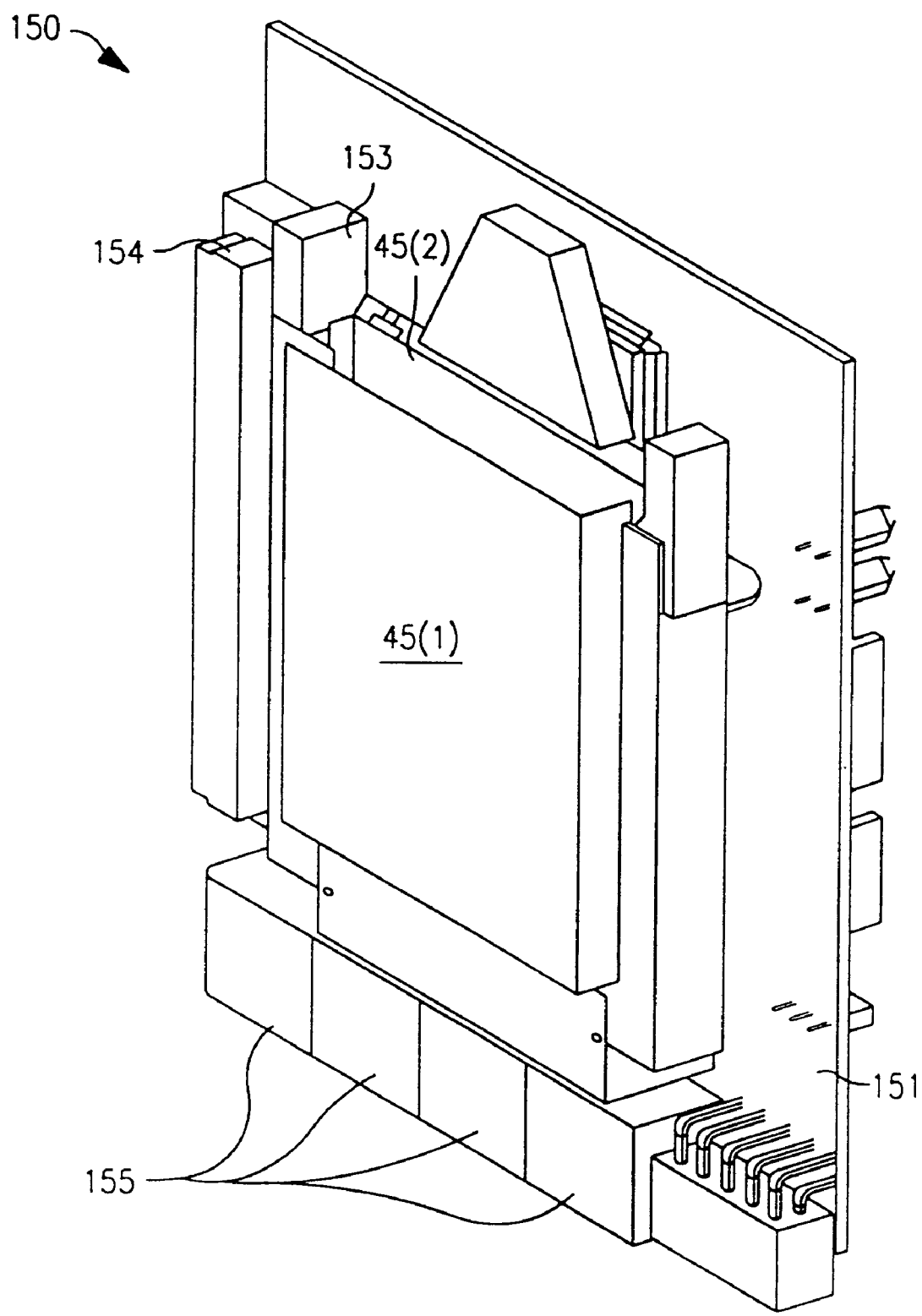
FIGS. 9A and 9B depict the physical structure of a processor module circuit structure which is useful in the field controller depicted in FIGS. 7 and 8.
Figure 9B:
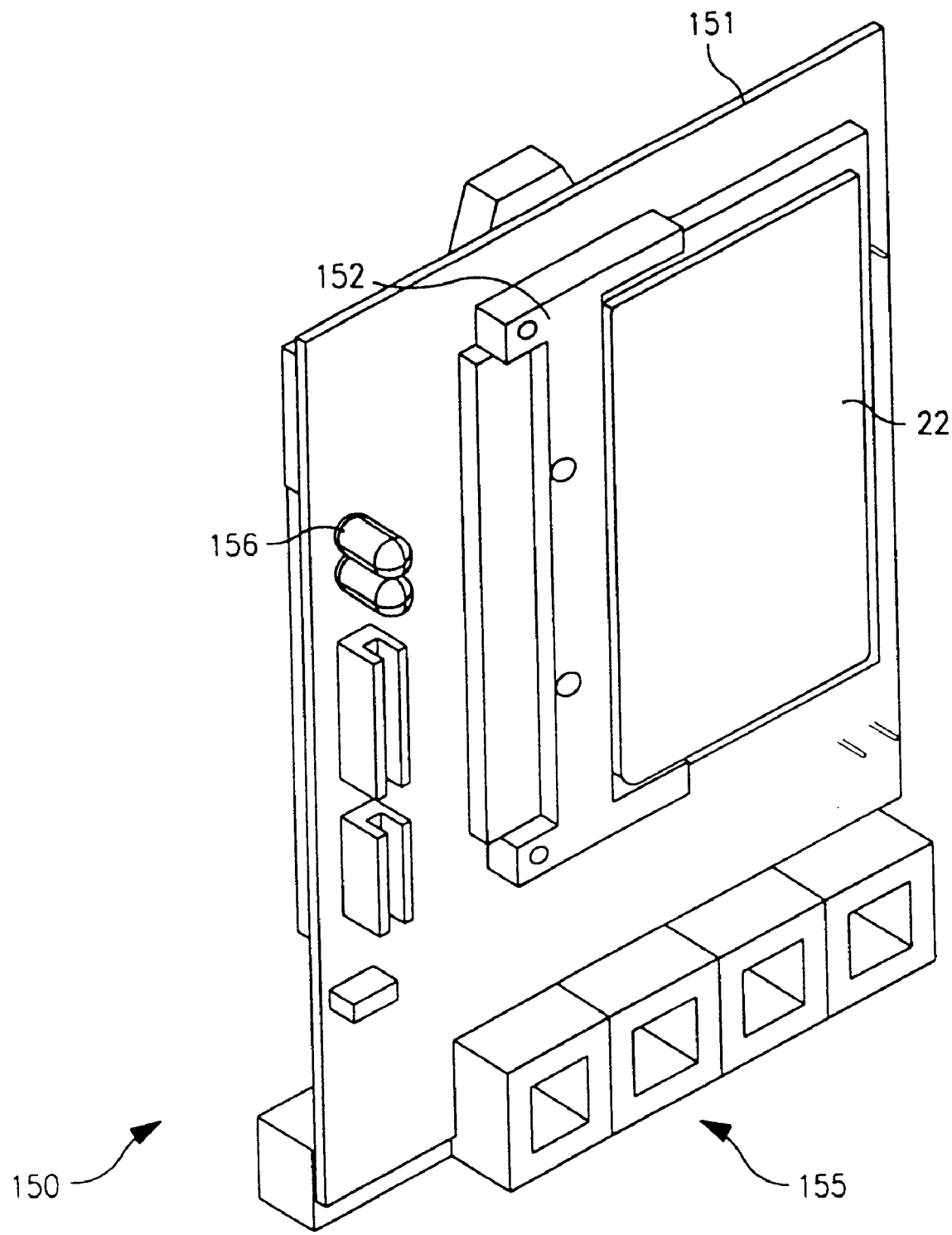

The structure of the processor module circuit structure 150 useful in connection with field controllers 112(f) and 112(f)' described above in connection with FIGS. 7 and 8 will be described in connection with FIGS. 9A and 9B, and the structure of the expansion module circuit structure 160 useful in the same embodiment will be described in connection with FIGS. 10A and 10B. With reference initially to FIGS. 9A and 9B, the processor module circuit structure 150 includes a circuit board 151 having mounted on one side thereof a connector 152 for receiving the processor sub-module 22 and on the other side a connector 153 for receiving the PCMCIA interface cards 45(1) and 45(2). The bus segment 27 in the processor sub-module 22 is internal to the processor sub-module itself, and is not depicted in FIGS. 10A and 10B. The circuit board 151 will be provided with traces (not shown) that electrically interconnect the connectors 152 and 153 and an off-board connector 154 (shown particularly in FIG. 9A), to carry signals among the processor sub-module 22 and PCMCIA interface cards 45(1) and 45(2). It will be appreciated that the connector 152 and circuit board traces generally correspond to the connector 43 and bus segment 40 depicted in FIG. 2A, and the connector 153 generally corresponds to the connectors 44(1) and 44(P) shown in FIG. 2. In addition, the off-board connector 154 generally corresponds to the upstream connector 47 in FIG. 2A. Circuit board 151 is also provided with connectors and the like, generally identified by reference numeral 155, for connecting the serial port 30, visual status indicators 31 and reset button 32 located on the access door 85(A), and for connecting the circuit board 90 to a power supply (not shown). In addition, the circuit board 151 supports light-emitting diodes 156 which register with light-emitting diode status display 126 or 137 to provide the above-described status indication.

As shown in FIGS. 9A and 9B, the connectors 151 and 152 are configured so that the processor sub-module 22 and PCMCIA interface cards 45(1) and 45(2) will be positioned generally parallel to the circuit board 150 so as to provide a relatively thin package that may be conveniently positioned in the segment housing 120 or 130 as described above. The off-board connector 154 corresponds to the connector 47

(FIG. 2A) and facilitates the connection between the processor module 20 and an expansion module 21(1). Preferably, the off-board connector 93 provides pins and/or receptacles that are oriented generally transversely to the plane of the circuit board 151.

With reference to FIGS. 6A and 6B, the expansion module circuit structure 160 also includes a circuit board 161 having mounted on one side thereof a connector 162 for receiving the PCMCIA interface cards 54(1) and 54(2), and in addition includes off-board connectors 163 and 164. The connector 101 is configured so that the PCMCIA interface cards 54(1) and 54(2) will be positioned generally parallel to the circuit board 160. Off-board connector 163, which is situated on the left of (as shown in FIGS. 10A and 10B) circuit board 161, includes pins and/or receptacles which are oriented generally transversely to the plane of the circuit board 161, and which mate with corresponding elements of the off-board connector 154 of the processor module circuit structure 150 (FIGS. 9A and 9B).

Figure 10A:
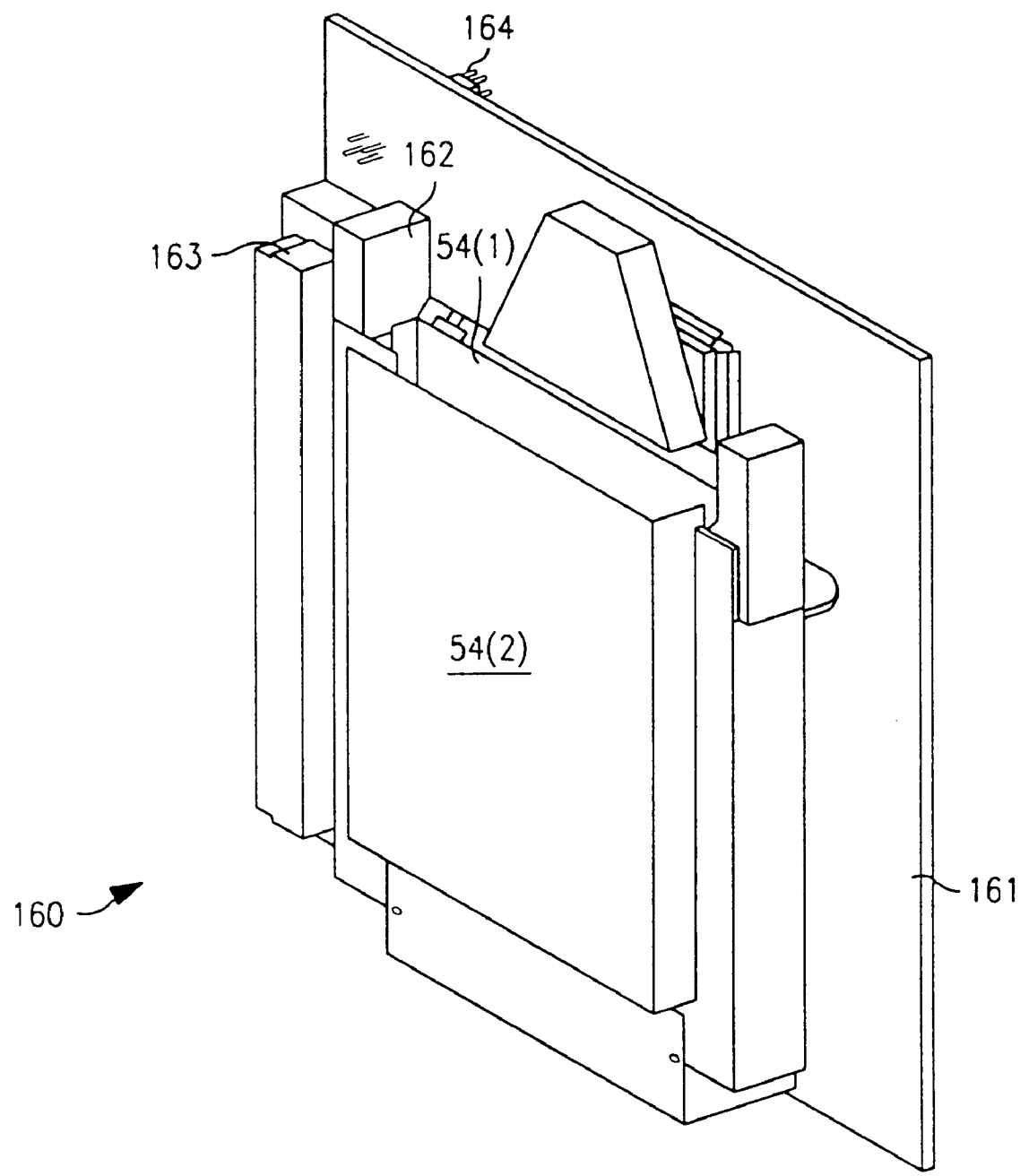
FIGS. 10A and 10B depict the physical structure of an expansion module circuit structure which is useful in the field controller depicted in FIGS. 7 and 8.
Figure 10B:
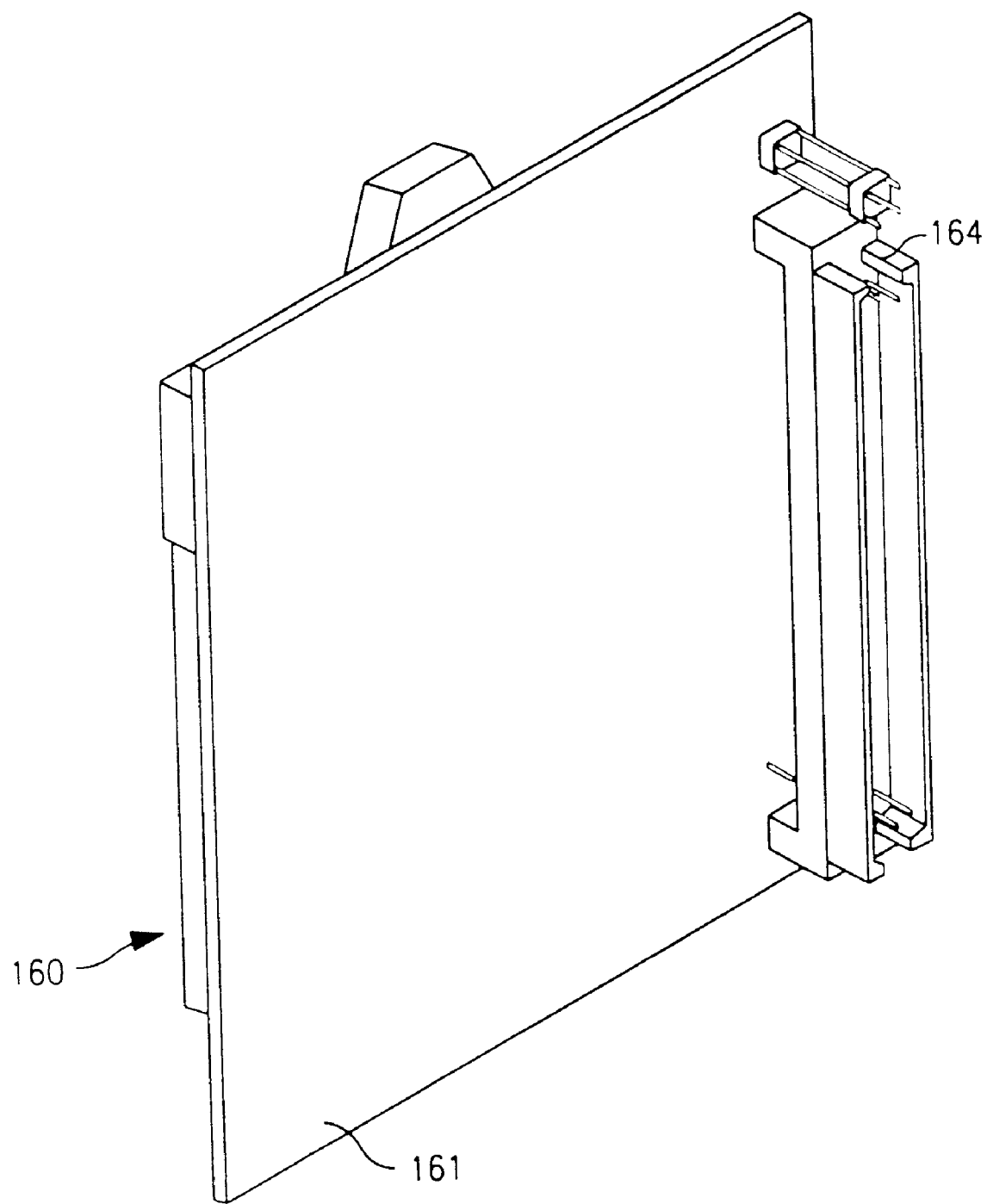

Off-board connector 164, which is situated to the right of (as shown in FIGS. 10A and 10B) circuit board 160 is similar to the off-board connector 153 of the processor module circuit structure and also provides pins and/or receptacles that are oriented generally transversely to the plane of the circuit board 161. Since the off-board connector 164 is similar to off-board connector 153, and since the off-board connector 164 will mate with the off-board connector 153 of the processor module circuit structure 150, the off-board connectors 164 of each successive expansion module circuit structure 160($e_B$), 21($e_C$), . . . , will also mate with the off-board connectors 163 of the respective previous expansion module circuit structure 160($e_A$), 21($e_B$), . . . , in the series of expansion module circuit structures 161($e$), thereby to accommodate addition of expansion modules as described above. It will be appreciated that the off-board connector 163 effectively corresponds to the downstream connector 50 of expansion module 21($e$) as described above, and the off-board connector 164 effectively corresponds to its upstream connector 52. The bus segment 51 will correspond to connections between the off-board connectors 163 and 164 on the circuit board as well as to electrically-conductive traces interconnecting the connectors 163/164 and the PCMCIA connector 162.

While the invention has been described in connection with use of a processor sub-module 22 and interface cards having respective characteristics conforming to the PCMCIA specification, such as the form factor and (in the case of the interface cards) electrical interface specification, it will be appreciated that the elements may have other form factors and interface specifications. It is preferable, however, that the elements have generally the same form factors, and be preferably relatively thin so that the segments 71($s$) may be relatively thin facilitating relatively tight packing. In addition, will be preferable that any bus comprising bus segments 27, 40, and 51 be a multi-drop bus so that the PCMCIA interface cards for the various controlled devices can be connected anywhere along the bus.

In addition, while the new field controller 12($f$) (as well as field controllers 112($f$) and 112($f$)) has been described as operating in a distributed control system 10 under control of an area controller 11, it will be appreciated that, depending on the particular application, area controller may not be necessary and the field controller may operate independently. In addition, it will be appreciated that a variety of devices may be controlled by a field controller as described herein, including other field controllers.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. An industrial computing device comprising:
a field mountable housing;
a processor, said processor being internal to said housing;
at least one peripheral connector adapted to receive at least one PCMCIA card such that when said PCMCIA card is plugged into said peripheral connector, said PCMCIA card is enclosed internal to said housing, said peripheral connector being electrically coupled to said processor, wherein said industrial computing device is self contained and without full user I/O in that said industrial computing device is without at least one of a full display and a full keyboard;
a first PCMCIA card plugged into a first peripheral connector of said at least one peripheral connector; and
an electrical connector attached to said first PCMCIA card by a cable, said cable being internal to said housing, said electrical connector being accessible external to said housing.

2. An industrial computing device comprising:
a field mountable housing;
a processor, said processor being internal to said housing; and
at least one peripheral connector adapted to receive at least one PCMCIA card such that when said PCMCIA card is plugged into said peripheral connector, said PCMCIA card is enclosed internal to said housing, said peripheral connector being electrically coupled to said processor, wherein said industrial computing device is self contained and without full user I/O in that said industrial computing device is without at least one of a full display and a full keyboard;
a first PCMCIA card plugged into a first peripheral connector of said at least one peripheral connector; and
an electrical connector attached to said first PCMCIA card by a cable, said cable being internal to said housing, said electrical connector being accessible external to said housing, wherein said electrical connector is flush mounted to said housing.

3. An industrial computing device comprising:
a field mountable housing;
processor, said processor being internal to said housing; and
at least one peripheral connector adapted to receive at least one PCMCIA card such that when said PCMCIA card is plugged into said peripheral connector, said PCMCIA card is enclosed internal to said housing, said peripheral connector being electrically coupled to said processor, wherein said industrial computing device is self contained and without full user I/O in that said industrial computing device is without at least one of a full display and a full keyboard, wherein said processor and said at least one peripheral connector are disposed on a common circuit board and wherein said processor and said at least one peripheral connector are disposed on opposite sides of said common circuit board.

4. An industrial computing device comprising:
a field mountable housing;
a processor, said processor being internal to said housing; and at least one peripheral connector adapted to receive at least one PCMCIA card such that when said PCMCIA card is plugged into said peripheral connector, said PCMCIA card is enclosed internal to said housing, said peripheral connector being electrically coupled to said processor, and wherein said processor and said at least one peripheral connector are disposed on opposite sides of a common circuit board.

* * * * *

UNITED STATES PATENT AND TRADEMARK OFFICE
CERTIFICATE OF CORRECTION

PATENT NO : 6,076,124
DATED : June 13, 2000
INVENTOR(S) : Simon Korowitz, Harris D. Kagan and Harold Lake It is certified that error appears in the above-identified patent and that said Letters Patent are hereby corrected as shown below:

Column 6, line 17: please delete "eironment"; and insert therefor
--environment--.

Column 15, line 58: please delete "112(f) and 112(f))"; and insert therefor
--112(f) and 112(f'))--.

Column 16, line 49: before "processor, said processor being internal to said housing"; please insert --a--.

Signed and Sealed this

Third Day of April, 2001

Attest:

NICHOLAS P. GODICI

Attesting Officer

Acting Director of the United States Patent and Trademark Office